(12) United States Patent
Okamoto et al.

(10) Patent No.: US 8,845,841 B2
(45) Date of Patent: Sep. 30, 2014

(54) MOLDING MATERIAL INSTALLATION METHOD AND INSTALLATION APPARATUS AND APPLICATION NOZZLE

(75) Inventors: Yohei Okamoto, Hiratsuka (JP); Yugo Nagase, Hiratsuka (JP); Yousuke Hamachi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 14/122,782

(22) PCT Filed: May 31, 2012

(86) PCT No.: PCT/JP2012/003572
§ 371 (c)(1),
(2), (4) Date: Dec. 5, 2013

(87) PCT Pub. No.: WO2012/164937
PCT Pub. Date: Dec. 6, 2012

(65) Prior Publication Data
US 2014/0083605 A1 Mar. 27, 2014

(30) Foreign Application Priority Data

May 31, 2011 (JP) ................................. 2011-121466

(51) Int. Cl.
| | | |
|---|---|---|
| B29C 47/06 | (2006.01) | |
| B29C 47/30 | (2006.01) | |
| C09J 5/06 | (2006.01) | |
| B29C 47/02 | (2006.01) | |
| B29C 47/00 | (2006.01) | |
| B29L 31/26 | (2006.01) | |

(52) U.S. Cl.
CPC . *B29C 47/30* (2013.01); *C09J 5/06* (2013.01); *B29C 47/0009* (2013.01); *B29L 2031/265* (2013.01); *B29C 47/0064* (2013.01); *B29C 47/026* (2013.01); *C09J 2400/143* (2013.01)

USPC .............. 156/244.11; 156/500; 264/173.12; 264/173.17; 264/252; 264/260; 425/113; 425/131.1; 425/463

(58) Field of Classification Search
CPC B29C 47/0064; B29C 47/026; B29C 47/065; B29C 47/0866; B29C 47/02
USPC .................................. 264/252, 260; 425/134
See application file for complete search history.

(56) References Cited

U.S. PATENT DOCUMENTS

| | | | |
|---|---|---|---|
| 5,552,194 A * | 9/1996 | Ito et al. ........................ 428/31 |
| 2002/0108695 A1* | 8/2002 | Lagrue et al. ................. 156/108 |
| 2002/0162619 A1* | 11/2002 | Shibuya et al. ............... 156/108 |
| 2006/0157890 A1* | 7/2006 | Amano et al. ................. 264/252 |
| 2008/0115451 A1* | 5/2008 | Watanabe et al. .......... 52/745.19 |

FOREIGN PATENT DOCUMENTS

| | | |
|---|---|---|
| JP | 2009-028662 | 2/2009 |
| JP | 2011-051802 | 3/2011 |
| JP | 2011-052371 | 3/2011 |

OTHER PUBLICATIONS

International Search Report dated Jul. 3, 2012, 2 pages, Japan.

\* cited by examiner

*Primary Examiner* — William Bell
(74) *Attorney, Agent, or Firm* — Thorpe North & Western LLP

(57) ABSTRACT

In a molding material installation method, an adhesive is separated into an upper side and a lower side from an application nozzle. The adhesive that has been separated on the lower side is applied to the surface of a multilayer glass panel. The adhesive that has been separated on the upper side is applied to a bottom surface of a glazing gasket molding material. The adhesive that has been separated on the upper side is placed on the adhesive that has been applied to the surface of the multilayer glass panel so that the glazing gasket molding material and the adhesive that has been separated on the upper side are applied to the adhesive that has been applied to the surface of the multilayer glass panel.

10 Claims, 7 Drawing Sheets

MOLDING MATERIAL INSTALLATION METHOD AND INSTALLATION APPARATUS AND APPLICATION NOZZLE

TECHNICAL FIELD

The present technology relates to a method for installing a molding material such as a gasket or sealing material that is extruded to a constant shape and installed onto a member with adhesive, an apparatus for implementing the method, and an application nozzle used in the method and the apparatus.

BACKGROUND TECHNOLOGY

The applicant has already proposed a method of manufacturing a multilayer glass panel with a glazing gasket in which glazing gasket molding material is ejected from an application nozzle to a constant shape together with adhesive, applied to the surface of the glass panel, and the glazing gasket molding material is installed on the surface of the glass panel with adhesive (Japanese Unexamined Patent Application Publication No. 2011-51802).

In this previous application, the glazing gasket molding material and the adhesive are ejected from the application nozzle, superimposed in two layers, and applied onto the surface of the glass panel.

However, the viscosities of the glazing gasket molding material and the adhesive are different. Generally, the viscosity of the adhesive is less than the viscosity of the glazing gasket molding material. Therefore, when the glazing gasket molding material and the adhesive are ejected from the application nozzle in the superimposed state, if the application nozzle is moved at high speed, variation can easily occur in the quantity of the adhesive with low viscosity. As a result, variation will easily occur in the installation strength of the glazing gasket.

Therefore, when assembling onto a window sash, the panel does not fit precisely, the raised part of the glazing gasket is scratched by the sash, and the glazing gasket is peeled, which is disadvantageous for improving the efficiency of the operation for assembly onto the sash.

SUMMARY

The inventors have diligently studied how to further improve the stability of the adhesive strength of the glazing gasket molding material to the glass panel with adhesive. As a result, a molding material installation method capable of stabilizing and increasing the installation strength of the molding material onto the member, even when the application nozzle is moved at high speed, an apparatus, and a molding material application nozzle have been proposed.

In other words, the present technology provides a molding material installation method capable of stabilizing and increasing the installation strength of the molding material onto the member, even when the application nozzle is moved at high speed, an installation apparatus, and a molding material application nozzle.

The present technology includes a molding material installation method for fitting molding material onto a member with adhesive by moving at least one of an application nozzle and the member, ejecting the molding material in a constant shape from the application nozzle together with the adhesive and applying the molding material and the adhesive to the member. The method comprises: separating the adhesive into an upper side and a lower side when ejecting the adhesive from the application nozzle; ejecting the adhesive that has been separated on the lower side from the application nozzle and applying the adhesive onto the member; ejecting the molding material and the adhesive that has been separated on the upper side from the application nozzle with the adhesive that has been separated on the upper side applied to a bottom surface of the molding material when ejecting the molding material from the application nozzle in a constant shape; placing the adhesive that has been separated on the upper side onto the adhesive that has been applied on the member, and applying the molding material together with the adhesive that has been separated on the upper side onto the adhesive that has been applied to the member.

Also, the present technology includes a molding material installation apparatus for fitting a molding material onto a member with an adhesive by moving at least one of an application nozzle and the member, ejecting the molding material in a constant shape from the application nozzle together with the adhesive and applying the molding material and the adhesive to the member. The apparatus comprises a moving device for moving at least one of the application nozzle and the member, wherein the application nozzle includes a molding material flow path, an adhesive flow path, and an outlet, the molding material flow path and the adhesive flow path are separated vertically so that the adhesive flow path is located below the molding material flow path, the outlet includes a lower outlet and an upper outlet that is located above and separated from the lower outlet, the lower outlet is connected to a lower portion of the adhesive flow path and configured so that the adhesive flowing in the adhesive flow path is ejected and applied to the member, the upper outlet is connected to the molding material flow path and also connected to an upper portion of the adhesive flow path and configured so that the molding material is ejected in a constant shape with the adhesive flowing in the adhesive flow path applied to a bottom surface of the molding material, and the molding material together with the adhesive that has been applied to the bottom surface of the molding material is applied to the adhesive that has been applied to the member so that the adhesive that has been applied to the bottom surface of the molding material is placed on the adhesive that has been applied to the member.

Also, the present technology includes an application nozzle for a molding material that ejects the molding material in a constant shape together with an adhesive and applies the molding material and the adhesive onto a member to fit the molding material to the member with the adhesive. The application nozzle comprises: a molding material flow path, an adhesive flow path, and an outlet, wherein the molding material flow path and the adhesive flow path are separated vertically so that the adhesive flow path is located below the molding material flow path, the outlet includes a lower outlet and an upper outlet that is located above and separated from the lower outlet, the lower outlet is connected to a lower portion of the adhesive flow path and configured so that the adhesive flowing in the adhesive flow path is ejected and applied to the member, and the upper outlet is connected to the molding material flow path and also connected to an upper portion of the adhesive flow path and configured so that the molding material is ejected in the constant shape with the adhesive flowing in the adhesive flow path applied to a bottom surface of the molding material, and the molding material together with the adhesive that has been applied to the bottom surface of the molding material is applied to the adhesive that has been applied to the member so that the adhesive that has been applied to the bottom surface of the molding material is placed on the adhesive that has been applied to the member.

According to the present technology, when the adhesive is ejected from the application nozzle, the adhesive is separated into an upper side and a lower side.

Then, the adhesive that has been separated on the lower side is ejected and applied to the member.

Also, the adhesive that has been separated on the upper side is ejected from the application nozzle together with the molding material, with the adhesive that has been separated on the upper side applied to the bottom surface of the molding material that has been ejected in a constant shape.

Then, the molding material is applied to the member with the adhesive that has been applied to the bottom surface of the molding material bonded to the adhesive that has been applied to the member.

Therefore, installation of the molding material onto the member is achieved by bonding adhesive to adhesive, so the molding material is more reliably bonded to and installed on the member with the adhesive.

Therefore, even if the application nozzle is moved at high speed, the variation in the installation strength of the molding material is suppressed, and it is possible to increase the installation strength.

DETAILED DESCRIPTION

Figure 1A:
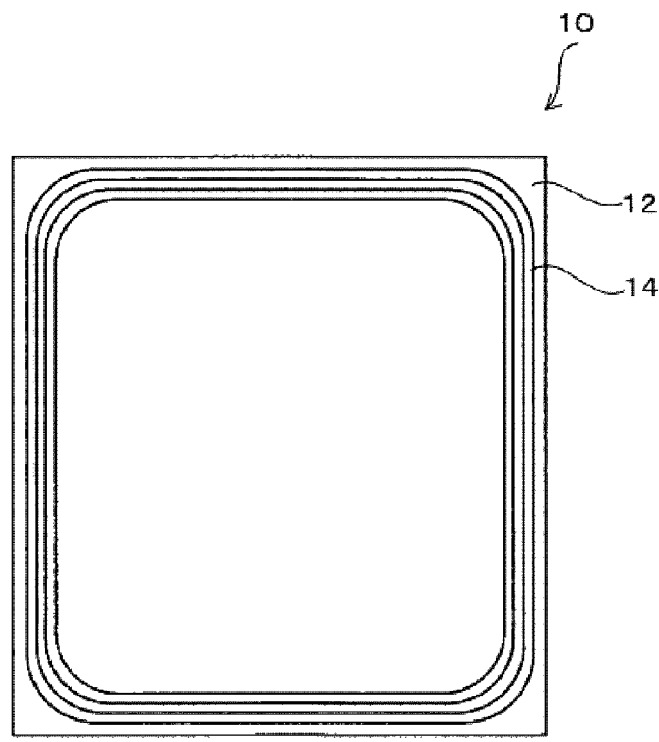
FIG. 1A is a plan view of a multilayer glass panel with a glazing gasket.

Next, embodiments of the present technology will be described while referring to the drawings.

In the embodiments of the present technology, an example of the manufacture of a multilayer glass panel with a glazing gasket is taken for explanation. In other words, in this embodiment, the molding material is a glazing gasket molding material, and the member is a glass panel.

First, the multilayer glass panel with a glazing gasket is described.

As illustrated in FIG. 1A, a multilayer glass panel with a glazing gasket 10 includes a multilayer glass panel 12 and a glazing gasket 14, the multilayer glass panel 12 includes two rectangular panes of glass of the same shape and size, and an air gap formed by a spacer between the peripheral edges of the two panes of glass.

The glazing gasket 14 is fitted along both edge surfaces of the multilayer glass panel 12 in a rectangular framework form.

Figure 2:
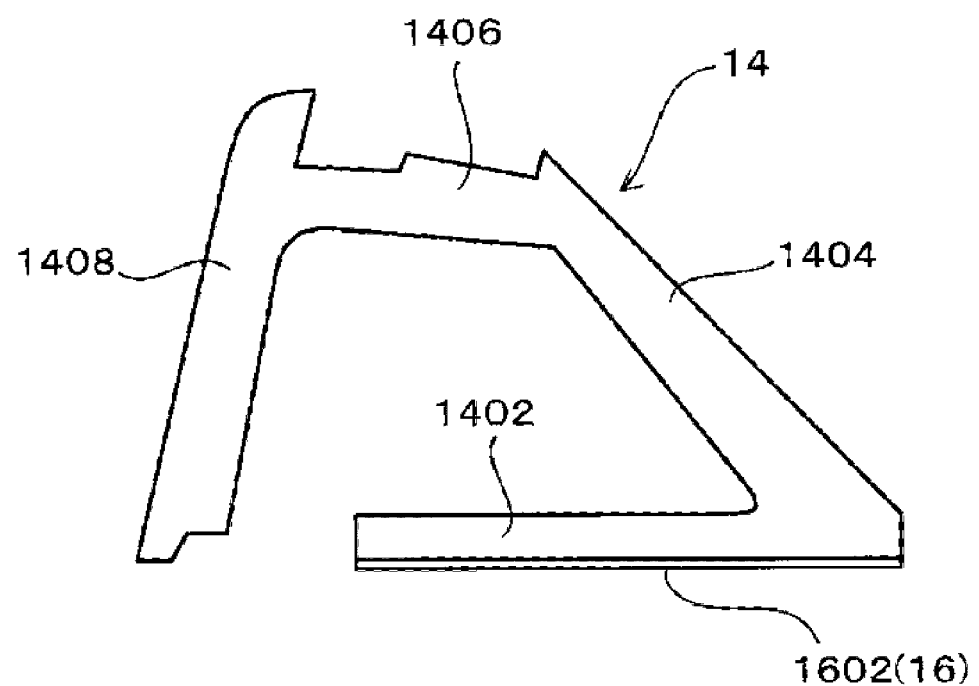
FIG. 2 is a cross-sectional view of the glazing gasket with adhesive applied.

As illustrated in FIG. 2, the cross-sectional shape of the glazing gasket 14 in the direction orthogonal to an extending direction thereof is a trapezoidal framework shape. In other words, the glazing gasket 14 includes a bottom side 1402, a first slanting side 1404 that rises from an end of the bottom side 1402, a top side 1406 that extends facing the bottom side 1402 from a top end of the first slanting side 1404, and a second slanting side 1408 that hangs down from an end of the top side 1406 toward an extension of the bottom side 1402, so that the end of the bottom side 1402 is separated from a lower end of the second slanting side 1408.

An adhesive layer 1602 made from adhesive 16 is provided on a bottom surface of the bottom side 1402, and the glazing gasket 14 is bonded to a surface of the multilayer glass panel 12 by the adhesive layer 1602.

Figure 3:
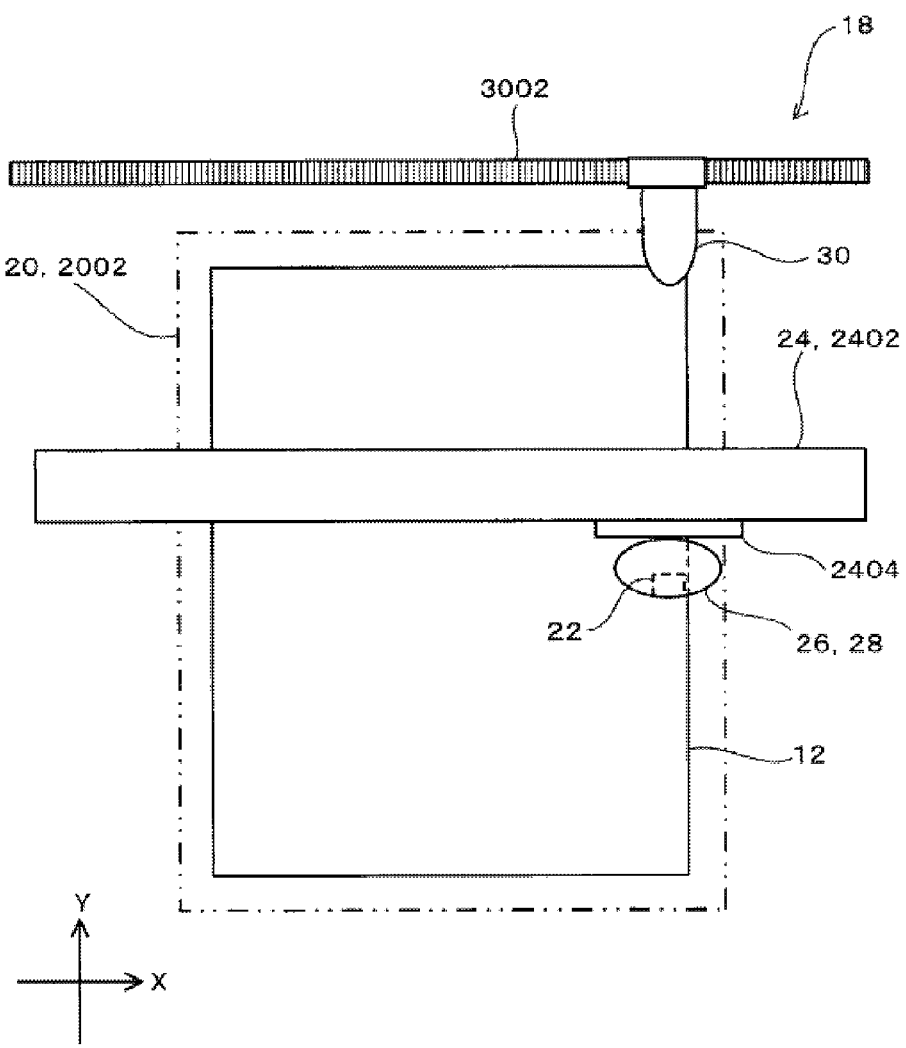
FIG. 3 is a plan view of a glass panel with a glazing gasket manufacturing apparatus.

As illustrated in FIG. 3, installation of the glazing gasket 14 on both surfaces of the multilayer glass panel 12 is carried out by a glass panel with a glazing gasket manufacturing apparatus 18.

The glass panel with a glazing gasket manufacturing apparatus 18 includes a multilayer glass panel movement mechanism 20, an application nozzle 22, a horizontal movement mechanism 24 for moving the application nozzle 22, a swiveling mechanism 26, an elevator mechanism 28, and a laser cutting device 30 that cuts applied glazing gasket molding material 1410.

The multilayer glass panel movement mechanism 20 horizontally supports the multilayer glass panel 12 and moves the multilayer glass panel 12 in a horizontal plane in the Y direction which is one of two orthogonal directions.

The multilayer glass panel movement mechanism 20 includes a table 2002 having a placement surface on which the multilayer glass panel 12 is placed, and a movement part (not illustrated) that moves the table 2002 in the Y direction.

The movement part includes a feed screw (not illustrated), a female screw member (not illustrated), a guide rod (not illustrated), an insertion part, and a pulse motor (not illustrated).

The feed screw extends in the Y direction. The female screw member is provided on the table 2002 and is screwed onto the feed screw. The guide rod extends in the Y direction, and the guide rod is inserted into the insertion part. The pulse motor drives the feed screw. Therefore, the table 2002 is moved in the Y direction by rotating the pulse motor forward or reverse.

The multilayer glass panel movement mechanism 20 is not limited to the configuration described above, and it may be configured from various commonly known actuators or motion mechanisms.

The horizontal movement mechanism 24 moves the application nozzle 22 in a horizontal plane in the X direction, which is the other of the two orthogonal directions, so that the application nozzle 22 is in a position above a top surface of the multilayer glass panel 12 supported by the multilayer glass panel movement mechanism 20.

The horizontal movement mechanism 24 includes a guide rail 2402 that is supported by a frame (not illustrated), and extends in the X direction above the table 2002 of the multilayer glass panel movement mechanism 20, and an X axis carrier 2404.

The X axis carrier 2404 is provided so that it can move forward and backward along the X axis direction on the guide rail 2402. The application nozzle 22 is supported by the X axis carrier 2404.

The horizontal movement mechanism 24 includes a drive unit that includes a feed screw and pulse motor and the like to move the X axis carrier 2404 in the X direction.

Therefore, the application nozzle 22 is moved in the X direction by rotating the pulse motor forward or reverse.

The horizontal movement mechanism 24 is not limited to the configuration described above, and it may be configured from various commonly known actuators or motion mechanisms.

The swiveling mechanism 26 changes the orientation of the application nozzle 22 at the corners of the multilayer glass panel 12, and is supported by the X axis carrier 2404.

The swiveling mechanism 26 swivels the application nozzle 22 in the horizontal plane about an axis that extends in the vertical direction, so that, at each corner of the multilayer glass panel 12, the orientation of the application nozzle 22 is changed by 90° each time to 0°, 90°, 180°, 270°, and 0°. In this way, the direction of application of the glazing gasket molding material 1410 is changed by 90° each time from 90°, 180°, 270°, to 0°.

The swiveling mechanism 26 includes a swiveling platform to which the application nozzle 22 is fitted, a bearing mechanism that supports the swiveling platform so that it can swivel about a vertical axis, and a pulse motor that rotates the swiveling platform.

Therefore, the application nozzle 22 is swiveled about an axis that extends in the vertical direction by rotating the pulse motor forward or reverse.

The swiveling mechanism 26 is not limited to the configuration described above, and it may be configured from various commonly known actuators or motion mechanisms.

The elevator mechanism 28 raises and lowers the application nozzle 22 on the swiveling platform at an application starting point where application of the glazing gasket molding material 1410 starts and an application finishing point where the application finishes.

Also, the elevator mechanism 28 retracts the application nozzle 22 to a retracted position above the glazing gasket molding material 1410 that has been applied to the multilayer glass panel 12. In this way, the application nozzle 22 is prevented from interfering with the glazing gasket molding material 1410 after it has been applied, so it is possible to move the multilayer glass panel with a glazing gasket 10 out and in.

The elevator mechanism 28 includes a drive unit that includes a feed screw for raising and lowering the application nozzle 22, a pulse motor for driving the feed screw, and the like.

Therefore, the application nozzle 22 is raised and lowered by rotating the pulse motor forward or reverse.

The elevator mechanism 28 is not limited to the configuration described above, and it may be configured from various commonly known actuators or motion mechanisms.

The laser cutting device 30 cuts glazing gasket 14 by irradiating it with laser light, and is moved in the X direction by a feed screw 3002.

A laser marker or the like that forms lines or characters on the surface of various materials by irradiating it with laser light can be used as the laser cutting device 30, for example.

Various wavelengths can be considered for the laser light emitted from the laser cutting device 30, but a wavelength that passes through glass and that reliably cuts the glazing gasket 14110 may be used. Various types of commonly known laser light such as a YAG laser or the like can be used as the laser light.

When the glazing gasket molding material 1410 is ejected from the application nozzle 22 together with the adhesive 16 and applied to the multilayer glass panel 12, at the application starting point and at the application finishing point, the quantity of adhesive 16 and glazing gasket molding material 1410 ejected is not stable, so the cross-sectional shape of the glazing gasket 14 is not the required shape.

Figure 1B:
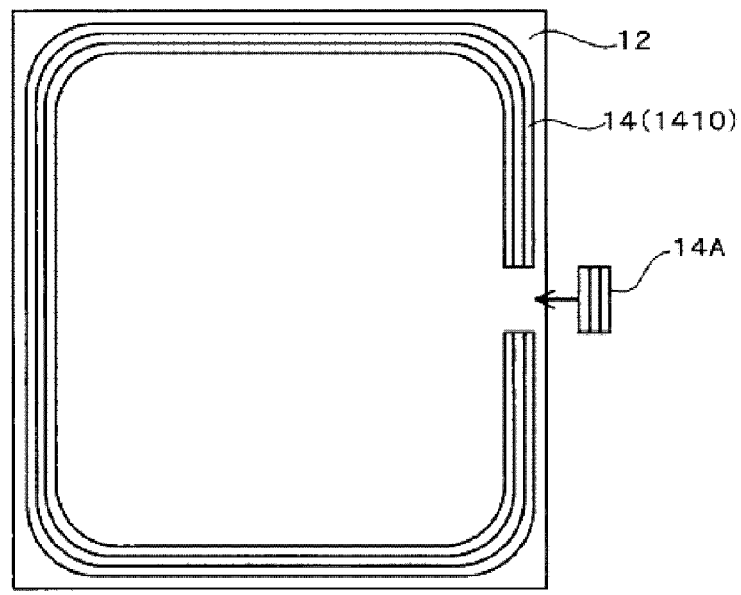
FIG. 1B is a plan view of the multilayer glass panel before installation of a glazing gasket molding body.

Therefore, as illustrated in FIG. 1B, the laser cutting device 30 cuts and removes the portions applied at these two locations, and a glazing gasket molding body 14A of the same cross-sectional shape that was formed in advance and has the same length as the length of the removed portions is fitted into the removed locations, and bonded with adhesive, and, in this way, the glazing gasket 14 is formed around the whole periphery of the top surface of the multilayer glass panel 12 as illustrated in FIG. 1A.

Figure 5:
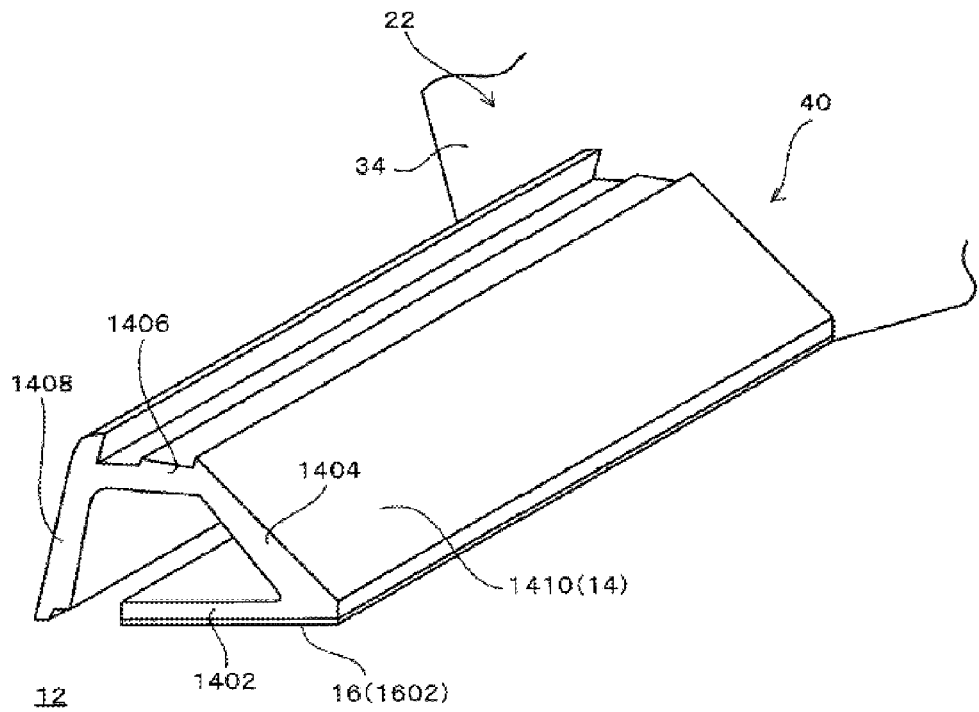
FIG. 5 is a perspective view of the glazing gasket molding material with the adhesive applied.

When the glazing gasket molding material 1410 is applied together with the adhesive 16 from the application nozzle 22 as illustrated in FIG. 5, at least one of the application nozzle 22 or the multilayer glass panel 12 is moved. In this embodiment, the multilayer glass panel 12 is moved in the Y direction by the multilayer glass panel movement mechanism 20, and the application nozzle 22 is moved in the X direction by the horizontal movement mechanism 24.

The multilayer glass panel 12 is supported horizontally by the multilayer glass panel movement mechanism 20, and, in this attitude, the glazing gasket molding material 1410 in the molten state is applied from the application nozzle 22 in a constant cross-sectional shape along the periphery of the top surface of the multilayer glass panel 12 that is oriented upwards, together with the adhesive 16 in the molten state with a viscosity that is lower than that of the glazing gasket molding material 1410.

Figure 4:
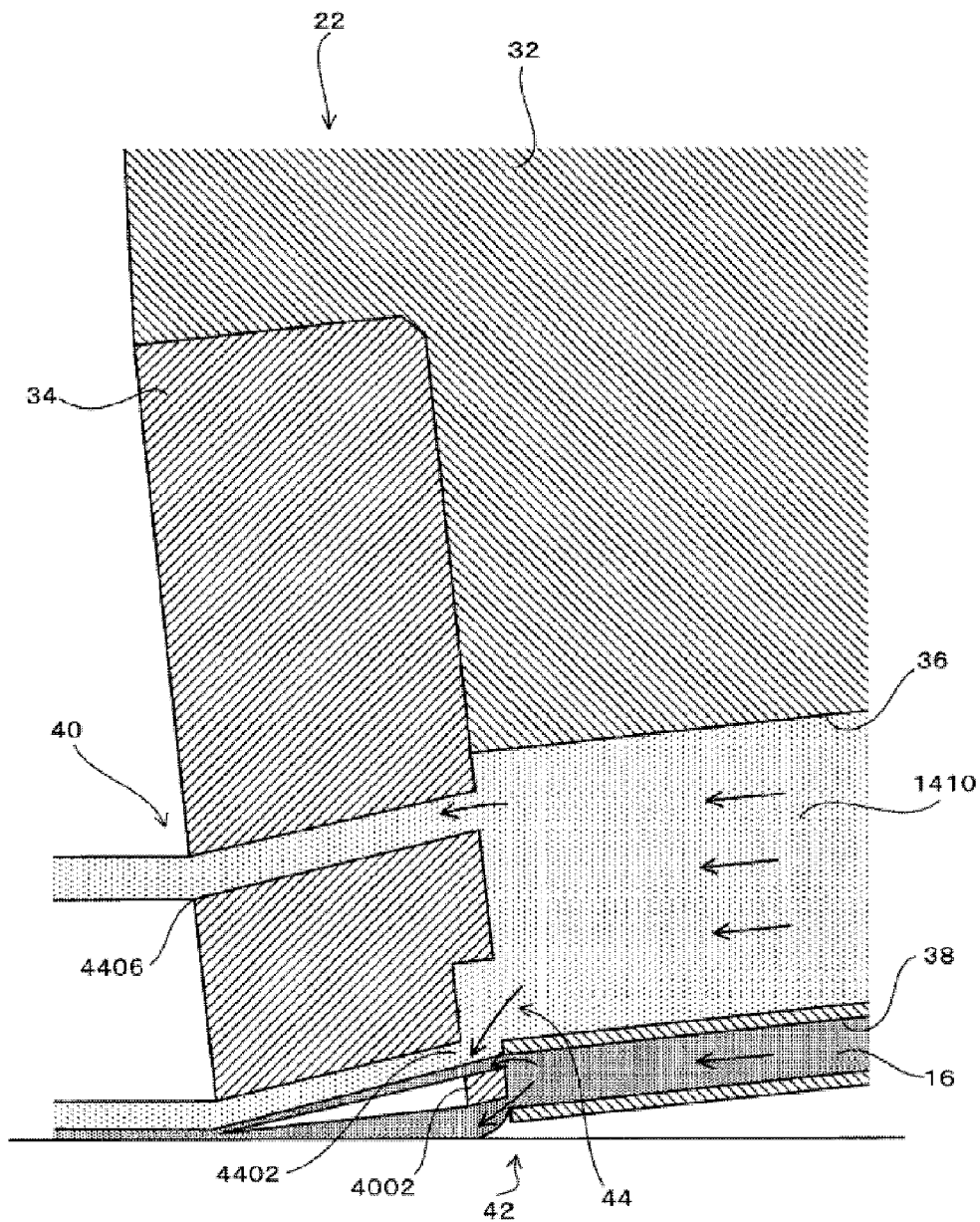
FIG. 4 is an explanatory diagram of a dice portion when applying the glazing gasket molding material and adhesive.

As illustrated in FIG. 4, the application nozzle 22 is configured from a nozzle main body 32, and a dice 34 for forming the glazing gasket that is fitted to the nozzle main body 32.

Also, the application nozzle 22 includes a glazing gasket molding material flow path 36 in which the glazing gasket molding material 1410 is delivered under pressure, an adhesive flow path 38 in which the adhesive 16 is delivered under pressure, and an outlet 40.

The glazing gasket molding material flow path 36 and the adhesive flow path 38 are provided in the nozzle main body 32, and the outlet 40 is provided in the dice 34.

The glazing gasket molding material flow path 36 is located in a position above and separated from the adhesive flow path 38.

The glazing gasket molding material 1410 in the molten state is supplied from an extruder (not illustrated) to a shot pump (not illustrated), and the glazing gasket molding material 1410 in the molten state is delivered under pressure from the shot pump to the glazing gasket molding material flow path 36. Likewise, the adhesive 16 in the molten state is supplied to a shot pump (not illustrated), and the adhesive 16 in the molten state is delivered under pressure by the shot pump to the adhesive flow path 38.

Figure 6A:
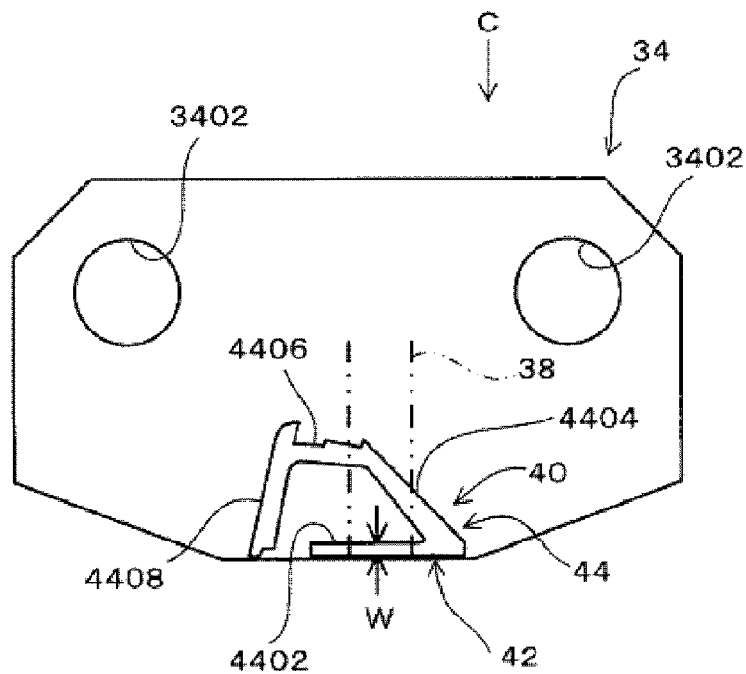
FIG. 6A is a front view of the dice.
Figure 6B:
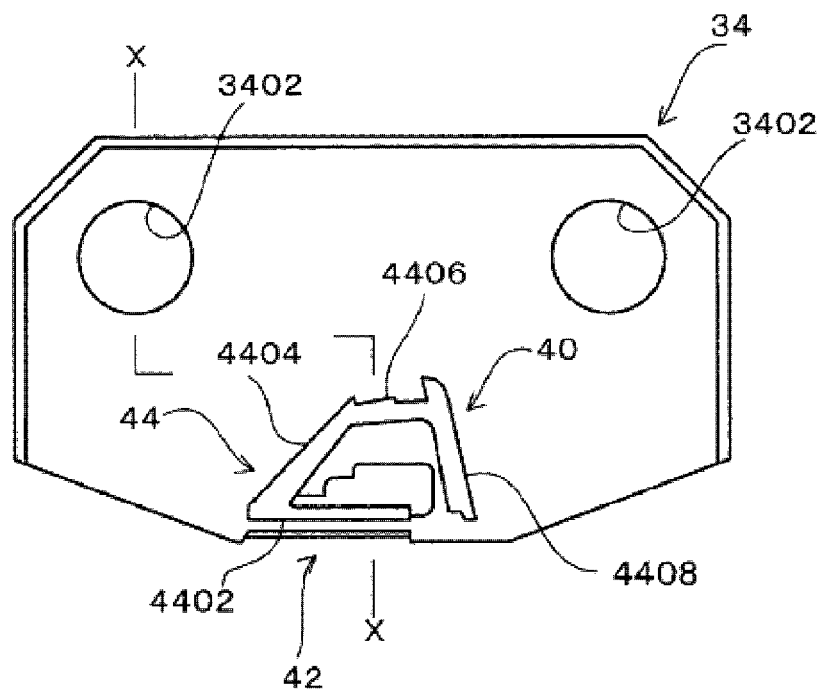
FIG. 6B is a rear view of the dice.
Figure 6C:
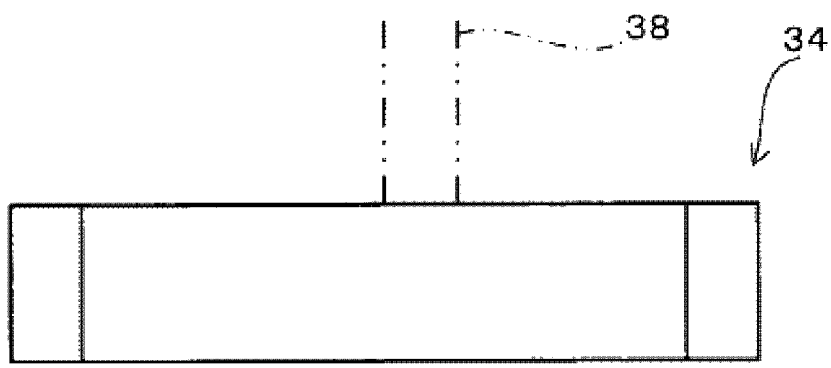
FIG. 6C is a view from an arrow C.
Figure 7:
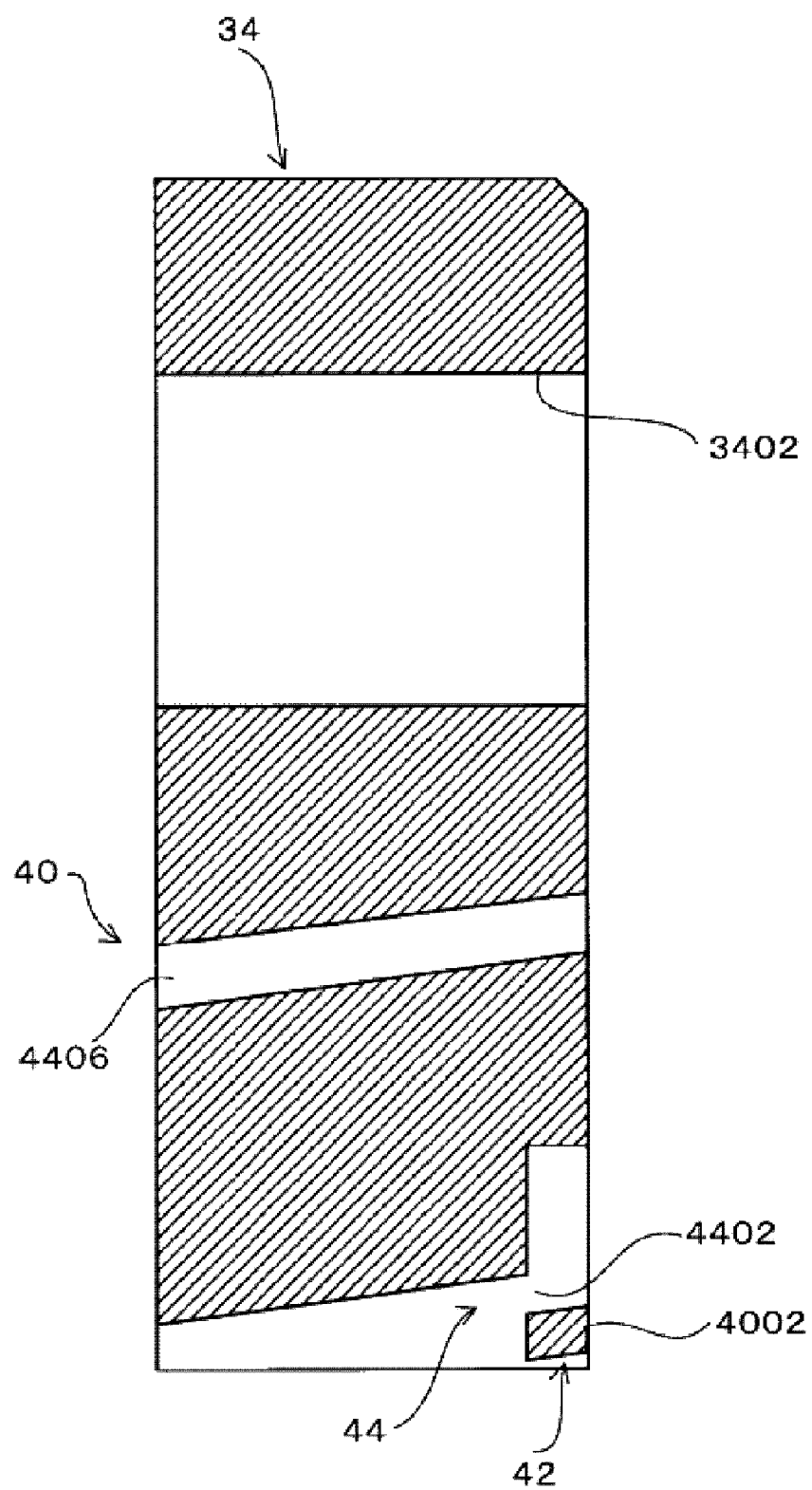
FIG. 7 is a cross-sectional view at X-X in FIG. 6B.

The dice 34 is fitted to an installation recess provided in the nozzle main body 32, and, as illustrated in FIGS. 6 and 7, is attached to the nozzle main body 32 by male screws inserted into insertion holes 3402.

The outlet 40 is provided in the dice 34.

The outlet 40 includes a lower outlet 42, and an upper outlet 44 that is located above and separated from the lower outlet 42.

The lower portion of adhesive flow path 38 is connected to the lower outlet 42.

The upper outlet 44 is connected to the glazing gasket molding material flow path 36 and to the upper portion of the adhesive flow path 38.

The portion of the upper outlet 44 connected to the upper portion of the adhesive flow path 38 and the lower outlet 42 have a predetermined width for ejecting the adhesive 16.

Also, as illustrated in FIGS. 6A and 6C, the adhesive flow path 38 is connected to the center portion in a width direction of a portion of the upper outlet 44 and the center portion in the width direction of the lower outlet 42, and, the portion of the adhesive flow path 38 connected to the center portion in the width direction of the upper outlet 44 and the center portion in the width direction of the lower outlet 42 extends in a direction normal to the width direction of the portion of the upper outlet 44 and the width direction of the lower outlet 42, configured so that the adhesive 16 can be ejected with pressure applied efficiently over the whole width.

The upper outlet 44 is provided with a shape that corresponds to the cross-section of the glazing gasket 14 that is to be formed. In other words, the upper outlet 44 includes a bottom side 4402, a first slanting side 4404, a top side 4406, and a second slanting side 4408 corresponding respectively to the bottom side 1402, the first slanting side 1404, the top side 1406, and the second slanting side 1408.

As illustrated in FIG. 6A, a dimension W in a vertical direction of the bottom side 4402 of the upper outlet 44 is formed slightly greater than the thickness of the bottom side 1402 of the gasket, and is related to the ejection of the adhesive 16 applied to the bottom surface of the bottom side 1402 of the glazing gasket molding material 1410 as described below.

As illustrated in FIG. 7, a partition wall 4002 is provided extending in the width direction below the bottom side 4402, and the bottom side 4402 that constitutes the upper outlet 44 and the lower outlet 42 are partitioned and separated vertically by the partition wall 4002.

Therefore, the adhesive 16 that is delivered under pressure in the adhesive flow path 38 is separated and divided vertically by the partition wall 4002, configured so that the lower side of the divided adhesive 16 is ejected from the lower side of the outlet 40 and applied onto the surface of the multilayer glass panel 12.

Also, the upper outlet 44 is configured so that the glazing gasket molding material 1410 is ejected in a constant shape and with the adhesive 16 that has been delivered under pressure from the adhesive flow path 38 (the adhesive 16 separated on the upper side by the partition wall 4002) applied to the bottom surface of the glazing gasket molding material 1410, and so that the adhesive 16 applied to the bottom surface of the glazing gasket molding material 1410 is placed on the adhesive 16 that has been applied to the surface of the multilayer glass panel 12, so that the glazing gasket molding material 1410 together with the adhesive 16 that has been applied on the bottom surface of the glazing gasket molding material 1410 is applied on the adhesive that has been applied to the surface of the multilayer glass panel 12.

The bottom side 1402 of the upper outlet 44 and the lower outlet 42 are linked together on a downstream side of the partition wall 4002 in a direction of flow of the glazing gasket molding material 1410 and the adhesive 16, however, as illustrated in FIG. 4, due to the viscosity of the glazing gasket molding material 1410, the glazing gasket molding material 1410 flows along the top wall of the bottom side 1402, and together with the adhesive 16 that was separated on the top side is applied from the end surface of the dice 34 onto the adhesive 16 that was applied to the surface of the multilayer glass panel 12.

As illustrated in FIG. 4, the upper outlet 44 and the lower outlet 42 are oriented so that when the glazing gasket molding material 1410 and the adhesive 16 are applied, they are ejected onto the surface of the multilayer glass panel 12 in a direction inclined from the horizontal direction toward the vertical direction, so that the glazing gasket molding material 1410 and the adhesive 16 are ejected under pressure toward the surface of the multilayer glass panel 12.

The following is a description of forming the glazing gasket 14 extended on the surface of the multilayer glass panel 12 using the application nozzle 22 configured as described above.

The multilayer glass panel 12 is placed on the placement surface of the table 2002 and positioned, and fixed so that it cannot move in the horizontal direction.

Then, the application nozzle 22 is positioned on the surface of the multilayer glass panel 12, the glazing gasket molding material 1410 is delivered in the molten state under pressure to the glazing gasket molding material flow path 36, and the adhesive 16 in the molten state is delivered under pressure to the adhesive flow path 38, at least one of the application nozzle and the multilayer glass panel 12 is moved, so that the application nozzle 22 is moved in the horizontal direction relative to the multilayer glass panel 12 extending along the positions on the surface of the multilayer glass panel 12 where the glazing gasket 14 is to be formed. Specifically, from the attitude in FIG. 3, the glazing gasket molding material 1410 is ejected from the outlet 40 together with the adhesive 16, the multilayer glass panel is moved by the multilayer glass panel movement mechanism 20 in the Y direction, and when the application nozzle 22 reaches a corner of the multilayer glass panel 12, the orientation of the application nozzle 22 is changed by 90° by the swiveling mechanism 26 at the corner, then, the application nozzle 22 is moved in the X direction by the horizontal movement mechanism 24, and when the application nozzle 22 reaches a corner of the multilayer glass panel 12, the orientation of the application nozzle 22 is changed by 90° by the swiveling mechanism 26 at the corner, then, the application nozzle 22 is moved in the Y direction by the multilayer glass panel movement mechanism 20, and, in this way, the glazing gasket molding material 1410 together with the adhesive 16 is applied in a rectangular framework form along the peripheral edges of the multilayer glass panel 12.

When the glazing gasket molding material 1410 is delivered under pressure to the glazing gasket molding material flow path 36 and the adhesive 16 in the molten state is delivered under pressure to the adhesive flow path 38, the adhesive 16 is separated into the upper side and the lower side by the partition wall 4002 at the outlet 40.

Then, the adhesive 16 that has been separated on the lower side is ejected from the lower outlet 42 and applied to the surface of the multilayer glass panel 12.

Also, the adhesive 16 that has been separated on the upper side is ejected from the upper outlet 44 (in detail, it is ejected from the bottom side 4402 of the upper outlet 44), and is ejected from the upper outlet 44 while applied to the bottom surface of the glazing gasket molding material 1410.

In other words, the glazing gasket molding material 1410 is ejected from the upper outlet 44 in a constant shape with the adhesive 16 that has been separated on the upper side applied to the bottom surface of the glazing gasket molding material 1410. Then, the glazing gasket molding material 1410 and the adhesive 16 that has been separated on the upper side are applied to the adhesive 16 that has been applied to the surface of the multilayer glass panel 12 so that the adhesive 16 that has been separated on the upper side is placed on the adhesive 16 that has been applied to the surface of the multilayer glass panel 12.

Then, the glazing gasket molding material 1410 hardens and becomes the glazing gasket 14, the adhesive 16 hardens and becomes the adhesive layer 1602, and the glazing gasket 14 is bonded to and installed on the multilayer glass panel 12 with high accuracy.

According to this embodiment, adhesive 16 to adhesive 16 bonding occurs between the adhesive 16 applied to the surface of the multilayer glass panel 12 and the adhesive 16 applied to the bottom surface of the glazing gasket molding material 1410, so the glazing gasket 14 is reliably bonded and installed on the surface of the multilayer glass panel 12 by the adhesive 16.

Therefore, even when the viscosity of the glazing gasket molding material 1410 and that of the adhesive 16 are different, and the application nozzle 22 is moved at high speed, the variation in the strength of installation of the glazing gasket 14 is suppressed, the glazing gasket 14 does not rise up, and it is possible to increase the installation strength of the glazing gasket 14, so it is possible to manufacture a high quality multilayer glass panel with a glazing gasket 10 at low cost.

In this embodiment, a case in which the glazing gasket molding material 1410 is installed on the multilayer glass panel 12 has been described, but of course the present embodiment can also be applied to a case in which the glazing gasket molding material 1410 is installed on a single glass panel.

Also, in this embodiment, a case in which the molding material was glazing gasket molding material 1410 and the member was the multilayer glass panel 12 was described, but the present technology can be widely applied to molding material applied together with adhesive to a member using the application nozzle, such as sealing material to be applied to various members.

The invention claimed is:

1. A molding material installation method for fitting a molding material onto a member with an adhesive by moving at least one of an application nozzle and the member; ejecting the molding material in a constant shape from the application nozzle together with the adhesive; and applying the molding material and the adhesive to the member; the method comprising:
   separating the adhesive into an upper side and a lower side when ejecting the adhesive from the application nozzle;
   ejecting the adhesive that has been separated on the lower side from the application nozzle and applying the adhesive onto the member;
   ejecting the molding material and the adhesive that has been separated on the upper side from the application nozzle, where in the adhesive that has been separated on the upper side is applied to a bottom surface of the molding material when ejecting the molding material from the application nozzle in a constant shape;
   placing the adhesive that has been separated on the upper side on the adhesive that has been applied to the member; and
   applying the molding material together with the adhesive that has been separated on the upper side onto the adhesive that has been applied to the member.

2. The molding material installation method according to claim 1, wherein the member is a glass panel, and the molding material is a glazing gasket molding material.

3. A molding material installation apparatus for fitting molding material onto a member with an adhesive by: moving at least one of an application nozzle and the member; ejecting the molding material in a constant shape from the application nozzle together with the adhesive; and applying the molding material and the adhesive to the member; the apparatus comprising:
   a moving device for moving at least one of the application nozzle and the member;
   the application nozzle including a molding material flow path, an adhesive flow path, and an outlet;
   the molding material flow path and the adhesive flow path being separated vertically so that the adhesive flow path is located below the molding material flow path;
   the outlet including a lower outlet and an upper outlet that is located above and separated from the lower outlet;
   the lower outlet being connected to a lower portion of the adhesive flow path and configured so that the adhesive flowing in the adhesive flow path is ejected and applied to the member; and
   the upper outlet being connected to the molding material flow path and also connected to an upper portion of the adhesive flow path, and configured so that the molding material is ejected in a constant shape with the adhesive flowing in the adhesive flow path applied to a bottom surface of the molding material, and the molding material together with the adhesive that has been applied to the bottom surface of the molding material applied to the adhesive that has been applied to the member so that the adhesive that has been applied to the bottom surface of the molding material is placed on the adhesive that has been applied to the member.

4. The molding material installation apparatus according to claim 3, wherein the member is a glass panel, and the molding material is a glazing gasket molding material.

5. The molding material installation apparatus according to claim 4, wherein a portion of the upper outlet that is connected to the upper portion of the adhesive flow path and the lower outlet have a width that permits the adhesive to be ejected with a constant width, and
   the adhesive flow path is connected to a center portion in a width direction of the portion of the upper outlet and to a center portion in a width direction of the lower outlet, and, the portion of the adhesive flow path that is connected to the center portion in the width direction of the portion of the upper outlet and to the center portion in the width direction of the lower outlet extends in a direction orthogonal to the width direction of the portion of the upper outlet and the width direction of the lower outlet.

6. The molding material installation apparatus according to claim 3, wherein a portion of the upper outlet that is connected to the upper portion of the adhesive flow path and the lower outlet have a width that permits the adhesive to be ejected with a constant width, and
   the adhesive flow path is connected to a center portion in a width direction of the portion of the upper outlet and to a center portion in a width direction of the lower outlet, and, the portion of the adhesive flow path that is connected to the center portion in the width direction of the portion of the upper outlet and to the center portion in the width direction of the lower outlet extends in a direction orthogonal to the width direction of the portion of the upper outlet and the width direction of the lower outlet.

7. An application nozzle for a molding material that ejects the molding material in a constant shape together with an adhesive and applies the molding material and the adhesive onto a member to fit the molding material to the member with the adhesive, the application nozzle comprising:
   a molding material flow path, an adhesive flow path, and an outlet;
   the molding material flow path and the adhesive flow path being separated vertically so that the adhesive flow path is located below the molding material flow path;
   the outlet including a lower outlet and an upper outlet that is located above and separated from the lower outlet;
   the lower outlet being connected to a lower portion of the adhesive flow path and configured so that the adhesive flowing in the adhesive flow path is ejected and applied to the member; and
   the upper outlet being connected to the molding material flow path and also connected to a upper portion of the adhesive flow path, and configured so that the molding material is ejected in the constant shape with the adhesive flowing in the adhesive flow path applied to a bottom surface of the molding material, and the molding material together with the adhesive that has been applied to the bottom surface of the molding material applied to the adhesive that has been applied to the member so that the adhesive that has been applied to the bottom surface of the molding material is placed on the adhesive that has been applied to the member.

8. The application nozzle for the molding material according to claim 7, wherein the member is a glass panel, and the molding material is a glazing gasket molding material.

9. The application nozzle for the molding material according to claim 8, wherein a portion of the upper outlet that is connected to the upper portion of the adhesive flow path and the lower outlet have a width that permits the adhesive to be ejected with a constant width, and the adhesive flow path is connected to a center portion in a width direction of the portion of the upper outlet and to a center portion in a width direction of the lower outlet, and, the portion of the adhesive flow path that is connected to the center portion in the width direction of the portion of the upper outlet and to the center portion in the width direction of the lower outlet extends in a direction orthogonal to the width direction of the portion of the upper outlet and the width direction of the lower outlet.

10. The application nozzle for the molding material according to claim 7, wherein a portion of the upper outlet that is connected to the upper portion of the adhesive flow path and the lower outlet have a width that permits the adhesive to be ejected with a constant width, and the adhesive flow path is connected to a center portion in a width direction of the portion of the upper outlet and to a center portion in a width direction of the lower outlet, and, the portion of the adhesive flow path that is connected to the center portion in the width direction of the portion of the upper outlet and to the center portion in the width direction of the lower outlet extends in a direction orthogonal to the width direction of the portion of the upper outlet and the width direction of the lower outlet.

* * * * *